US012769135B2

(12) United States Patent
Lyu et al.

(10) Patent No.: US 12,769,135 B2
(45) Date of Patent: Oct. 20, 2026

(54) OPTICAL MODULE FOR NEAR-EYE DISPLAY DEVICE AND NEAR-EYE DISPLAY DEVICE

(71) Applicant: GYGES LABS PTE. LTD., Kaki Bukit (SG)

(72) Inventors: Zheng Lyu, Shenzhen (CN); Dong Pu, Shenzhen (CN); Jieyang Jia, Shenzhen (CN); Yingnan Zhai, Shenzhen (CN)

(73) Assignee: GYGES LABS PTE. LTD., Kaki Bukit (SG)

( * ) Notice: Subject to any disclaimer, the term of this patent is extended or adjusted under 35 U.S.C. 154(b) by 200 days.

(21) Appl. No.: 18/887,052

(22) Filed: Sep. 17, 2024

(65) Prior Publication Data

US 2025/0291186 A1 Sep. 18, 2025

Related U.S. Application Data

(63) Continuation-in-part of application No. 18/770,710, filed on Jul. 12, 2024.

(30) Foreign Application Priority Data

Mar. 15, 2024 (CN) ......................... 202410306460.0
Mar. 15, 2024 (CN) ......................... 202420542101.0

(51) Int. Cl.
*G02B 27/01* (2006.01)
*G02B 17/08* (2006.01)
*G02B 27/30* (2006.01)

(52) U.S. Cl.
CPC ..... *G02B 27/0172* (2013.01); *G02B 17/0808* (2013.01); *G02B 27/30* (2013.01); *G02B 2027/0178* (2013.01)

(58) Field of Classification Search
CPC .................................................. G02B 27/0172
See application file for complete search history.

(56) References Cited

U.S. PATENT DOCUMENTS

2020/0041790 A1* 2/2020 Martinez ............ G02B 27/0172

* cited by examiner

*Primary Examiner* — Joseph P Martinez

(57) ABSTRACT

An optical module for a near-eye display device includes a substrate including a first curved surface and a second curved surface spaced apart from each other. The first curved surface has a first reflection area and an exit area located on periphery of the first reflection area, and the second curved surface has an incident area and a second reflection area located on periphery of the incident area. At least one of the first curved surface and the second curved surface is a continuous curved surface. The incident area is configured for receiving light rays. The light rays pass through the incident area, the first reflection area, the second reflection area, and are emitted from the exit area. A shape of a projection of each of the first reflection area and the incident area in a first direction is an ellipse. The near-eye display device is further provided.

20 Claims, 6 Drawing Sheets

OPTICAL MODULE FOR NEAR-EYE DISPLAY DEVICE AND NEAR-EYE DISPLAY DEVICE

CROSS-REFERENCE TO RELATED APPLICATIONS

The present application is a continuation-in-part of patent application Ser. No. 18/770,710, filed Jul. 12, 2024, which claims priorities to Chinese Patent Application No. 202420542101.0, filed Mar. 15, 2024, and Chinese Patent Application No. 202410306460.0, filed Mar. 15, 2024, both of which are herein incorporated by reference in their entirety.

TECHNICAL FIELD

The present disclosure relates to the technical field of augmented reality, and in particular to an optical module for a near-eye display device and a near-eye display device.

BACKGROUND

Extended reality includes all real augmented and virtual technologies, including augmented reality (AR), virtual reality (VR), and mixed reality (MR). Above technologies have led to the continuous emergence of various smart glasses, helmets, etc. The augmented reality provides an enhanced perceptual experience by overlaying virtual information onto real-world scenes or environments, and has a wide range of applications in various fields, including entertainment, education, healthcare, industry, or the like. The augmented reality may provide an immersive experience, helping people better understand and interact with the world. For example, core components of a near-eye display device include an optical module and a display module. The relevant optical module includes an incident area and an exit area, such as a coupling in area and a coupling out area based on an optical waveguide, etc. However, the optical module has a larger volume and higher production and manufacturing costs. In addition, low optical utilization based on the above solution results in poor imaging performance of the optical module. That is, the core components of the near-eye display device include the optical module and the display module. The optical module has complex processing operations, high processing difficulty, and high costs.

SUMMARY OF THE DISCLOSURE

An optical module for a near-eye display device provided in the embodiments of the present disclosure, includes a substrate.

The substrate includes a first curved surface and a second curved surface spaced apart from each other.

The first curved surface includes a first reflection area and an exit area located on periphery of the first reflection area, the second curved surface includes an incident area and a second reflection area located on periphery of the incident area, at least one of the first curved surface and the second curved surface is a continuous curved surface; each of the first reflection area and the exit area includes a continuous curved surface, and/or each of the incident area and the second reflection area includes a continuous curved surface.

The incident area is configured for receiving light rays from the display module, the light rays sequentially pass through the incident area, the first reflection area, the second reflection area, and are emitted from the exit area; the exit area is configured for transmitting the light rays towards human eye. A shape of a projection of each of the first reflection area and the incident area in a first direction is an ellipse.

In some embodiments, the shape of the projection of the first reflection area in the first direction is defined as a first ellipse, and the first ellipse includes a first major axis and a first minor axis that are perpendicular to each other. The shape of the projection of the incident area in the first direction is defined as a second ellipse, and the second ellipse includes a second major axis and a second minor axis that are perpendicular to each other. The first major axis and the second major axis are parallel to each other, and the first minor axis and the second minor axis are parallel to each other. In the first direction, an area of the projection of the first reflection area is greater than or equal to an area of the projection of the incident area.

In some embodiments, the substrate has a central optical axis, and a Cartesian coordinate system is constructed with the central optical axis as an origin. In the Cartesian coordinate system, the shape of the projection of the first reflection area satisfies an equation:

$$\frac{y^2}{a_1^2}+\frac{x^2}{b_1^2}=1,$$

and $\alpha_1>b_1>0$; and the shape of the projection of the incident area satisfies an equation:

$$\frac{y^2}{a_2^2}+\frac{x^2}{b_2^2}=1,$$

and $\alpha_2>b_2>0$.

A length of each of the first major axis and the second major axis is 3 mm±0.5 mm, and a length of each of the first minor axis and the second minor axis is 2 mm±0.4 mm. An eccentricity of the first ellipse is equal to that of the second ellipse.

In some embodiments, in a plane perpendicular to the central optical axis, the central optical axis appears as a point; and each of the incident area, the first reflection area, the second reflection area, and the exit area is point-symmetric with respect to the point. The first reflection area is axially symmetric with respect to the first major axis and the first minor axis, and the incident area is axially symmetric with respect to the second major axis and the second minor axis.

In some embodiments, a shape of a projection of the exit area in the first direction is a first closed shape, and the first closed shape is formed by surrounding though using two opposite straight edges and two opposite curved edges. A shape of a projection of the second reflection area in the first direction is a second closed shape, and the second closed shape is formed by surrounding though using two opposite straight edges and two opposite curved edges. A first distance from a boundary of the incident area to a boundary of the second reflection area along an X-axis of the Cartesian coordinate system is less than a second distance from a boundary of the incident area to a boundary of the second reflection area along a Y-axis of the Cartesian coordinate system. A third distance from a boundary of the first reflection area to a boundary of the exit area along the X-axis of the Cartesian coordinate system is less than a fourth distance from a boundary of the first reflection area to a boundary of the exit area along the Y-axis of the Cartesian coordinate system. Each of the first distance and the third distance is 2 mm±0.5 mm, and each of the second distance and the fourth distance is 1 mm±0.4 mm.

In some embodiments, the first curved surface and the second curved surface are continuous curved surfaces, each of the first reflection area and the exit area includes a continuous curved surface, and/or each of the incident area and the second reflection area includes the continuous curved surface, and the continuous curved surface includes a single function curved surface.

In some embodiments, a solid transmission medium is disposed between the first curved surface and the second curved surface.

In some embodiments, orientation of the first curved surface and orientation of the second curved surface are the same, and the first curved surface and the second curved surface are coaxial with respect to a central optical axis of the display module; the first curved surface and the second curved surface includes one or a combination of a spherical surface or a free form surface; and in a direction of the central optical axis, the first reflection area and the second reflection area at least partially overlap.

In some embodiments, the first curved surface and the second curved surface are calculated using a Zernike polynomials function, a maximum distance between the exit area and the central optical axis is defined as T3, a maximum distance between the first reflection area and the central optical axis is defined as T2, a maximum distance between the second reflection area and the central optical axis is defined as T5, a maximum distance between the incident area and the central optical axis is defined as T4, and $T5>T3>T2>T4$.

In some embodiments, a convex surface of the incident area faces the display module, a concave surface of the exit area faces the human eye, a maximum dimension of the first curved surface in a transverse direction is greater than a maximum dimension of the first curved surface in a longitudinal direction, and a maximum dimension of the second curved surface in a transverse direction is greater than a maximum dimension of the second curved surface in a longitudinal direction.

In some embodiments, the substrate is provided with a first reflective layer and a second reflective layer, the first reflective layer is disposed on the first curved surface to form the first reflection area, and the second reflective layer is disposed on the second curved surface to form the second reflection area; and the first reflective layer is located on a side of the substrate facing the human eye, and the second reflective layer is located on a side of the substrate facing the display module.

In some embodiments, a maximum dimension of the first reflection area in the transverse direction and/or a maximum dimension of the exit area in the transverse direction is greater than a maximum dimension of the first reflection area in the longitudinal direction and/or a maximum dimension of the exit area in the longitudinal direction; and a maximum dimension of the incident area in the transverse direction and/or a maximum dimension of the second reflection area in the transverse direction is greater than a maximum dimension of the incident area in the longitudinal direction and/or a maximum dimension of the second reflection area in the longitudinal direction.

In some embodiments, the substrate includes a side wall surface that is connected to the first curved surface and the second curved surface, and the side wall surface is provided with an opaque layer or a third reflective layer.

In some embodiments, $0.84\ mm \le T2 \le 1.26\ mm$, $1.568\ mm \le T3 \le 2.352\ mm$, $1.056\ mm \le T4 \le 1.584\ mm$, $2.16\ mm \le T5 < 3.244\ mm$.

In some embodiments, a distance between the first curved surface and the second curved surface along the direction of the central optical axis is defined as T1, and $1.184\ mm \le T1 \le 1.776\ mm$.

In some embodiments, the first curved surface and the second curved surface are coaxial, the first curved surface has a central area and a peripheral area located periphery of the central area, and only the central area of the first curved surface is coated to form the first reflection area; and the second curved surface has a central area and a peripheral area located periphery of the central area, and only the peripheral area of the second curved surface is coated to form the second reflection area.

The present disclosure further provides a near-eye display device including a device body, a display module, and the optical module of any one of above embodiments.

The display module is configured for emitting light rays.

The display module and the optical module are installed on the device body.

BRIEF DESCRIPTION OF THE DRAWINGS

In order to more clearly illustrate the technical solutions in some embodiments of the present disclosure or in the related art, hereinafter, a brief introduction will be given to the accompanying drawings that are used in the description of some embodiments or the related art. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

Figure 1:
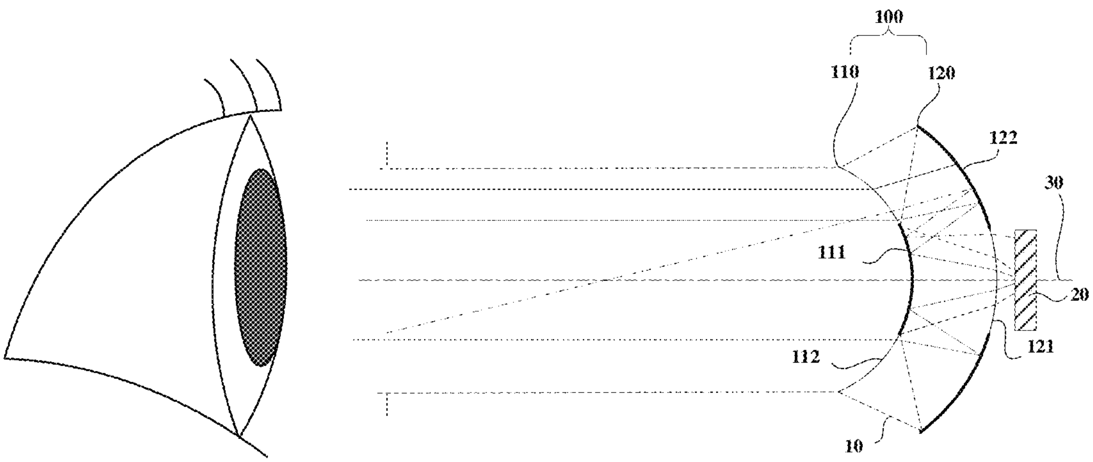
FIG. 1 is an operating schematic view of an optical module for a near-eye display device in some embodiments of the present disclosure.

In order to make purpose, technical solutions, and advantages of the present disclosure clearer, the technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

In related art, the optical module for the near-eye display devices includes an incident area and an exit area, and a reflection area disposed between the incident area and the exit area along a light path. In order to achieve encapsulation of the optical module, the incident area and the exit area are generally planar structures. However, the optical module has been proven through practice to have problems, such as limited view field angle and insufficient brightness, resulting in poor imaging performance. In addition, the near-eye display device with the optical waveguide cannot be combined with ordinary glasses, such as daily sunglasses, protective goggles, or near/far vision glasses. On this basis, in order to obtain an effective light path, the reflection area is generally a non-planar structure, especially different reflection areas need to be disposed with different non-planar surfaces, such as a spherical surface. In the related art, the optical module has both the planar structure and a curved structure, which may lead to complex processing operations, high processing difficulty, and high costs. Moreover, at a transition connection position between the planar structure and the curved structure, it is easy to cause light loss or change a preset path of an original light ray, thereby affecting the imaging quality of the optical module.

The present disclosure provides an optical module for a near-eye display device and a near-eye display device, which may solve the problems of complex processing operations, high processing difficulty, and high costs of the optical module mentioned above, thereby improving the imaging quality. It may solve the problems of limited view field angle and insufficient brightness of the optical module mentioned above, thereby improving the imaging quality. The near-eye display device may be used in conjunction with the ordinary glasses, thereby making the ordinary glasses have the function of intelligent glasses.

Additional aspects and advantages of the present disclosure may be given in part in the description below, and another part may become apparent from the description below, or known through the practice of the present disclosure.

The present disclosure provides an optical module for a near-eye display device, which may solve the technical problems of complex processing, high processing difficulty, and high costs of the optical module in the related art.

The optical module for the near-eye display device and the near-eye display device of the present disclosure are described in conjunction with FIGS. 1 to 10.

As illustrated in FIG. 1, the optical module 10 of the near-eye display device (hereinafter the optical module 10) in some embodiments of the present disclosure is provided. The optical module 10 includes a substrate 100. The substrate 100 includes a first curved surface 110 and a second curved surface 120. At least one of the first curved surface 110 and the second curved surface 120 is a continuous curved surface. The continuous curved surface refers to any curved surface that exhibits smooth and continuity without any discontinuity or sudden change in space, such as the spherical surface, an ellipsoidal surface, a free form surface, etc.

Figure 2:
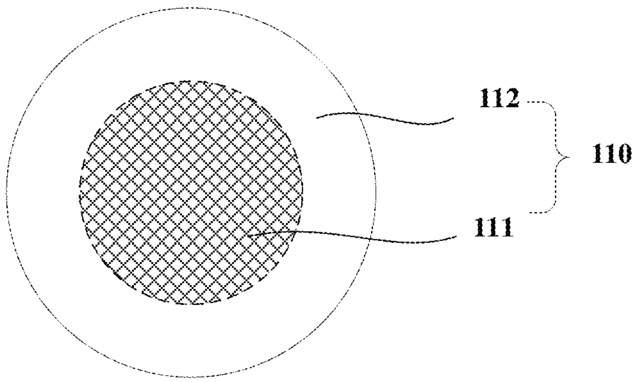
FIG. 2 is a structural schematic view of a first curved surface in some embodiments of the present disclosure.
Figure 3:
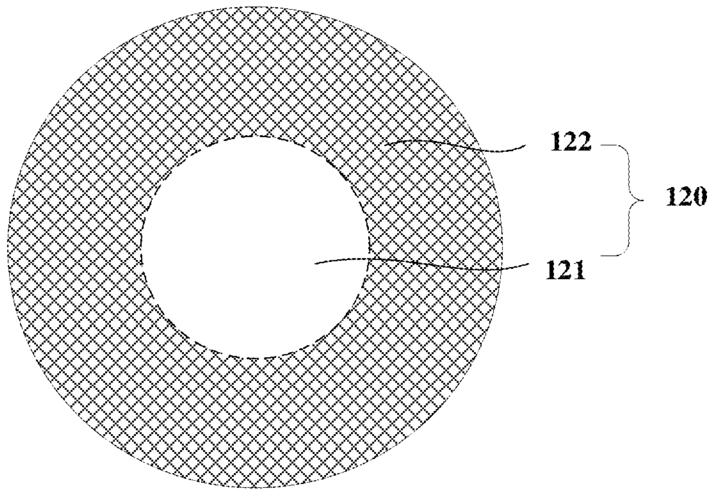
FIG. 3 is a structural schematic view of a second curved surface in some embodiments of the present disclosure.
Figure 4:
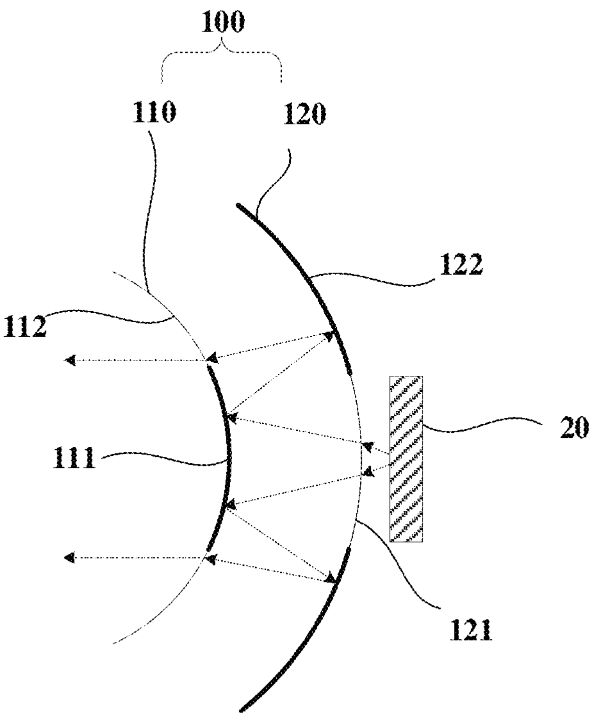
FIG. 4 is an operating schematic view of the optical module for the near-eye display device in some embodiments of the present disclosure.

The first curved surface 110 is spaced apart from the second curved surface 120. A solid transmission medium may be disposed between the first curved surface 110 and the second curved surface 120. In some embodiments, a material of the substrate 100 includes transparent or light-transmitting medium, such as epoxy resin, glass, or the like. The light path is formed between the first curved surface 110 and the second curved surface 120, and the incident area 121 is configured to receive light rays from a display module 20. As illustrated in FIG. 2 and FIG. 3, the first curved surface 110 includes a first reflection area 111 and an exit area 112 located on periphery of the first reflection area 111. The second curved surface 120 includes an incident area 121 and a second reflection area 122 located on periphery of the incident area 121. FIG. 3 and FIG. 4 show that the exit area 112 is located on the periphery of the first reflection area 111, and the second reflection area 122 is located on the periphery of the incident area 121. The light path may be a path of the light rays that sequentially pass through the incident area 121, the first reflection area 111, and the second reflection area 122, and are emitted from the exit area 112. The exit area 112 is configured to transmit the light rays towards the human eye. The term "periphery" of "the exit area 112 on the periphery of the first reflection area 111" and "the second reflection area 122 on the periphery of the incident area 121" may refer to "outer periphery" or "inner periphery". FIG. 2 and FIG. 3 show the case where the "periphery" is the "outer periphery", the exit area 112 surrounds the first reflection area 111, and the second reflection area 122 surrounds the incident area 121. In response to the "peripheral" referring to the "inner periphery", the first reflection area 111 surrounds the exit area 112, and the incident area 121 surrounds the second reflection area 122. At least one of the first curved surface 110 and the second curved surface 120 is the continuous curved surface. The first reflection area 111 and the exit area 112 includes the continuous curved surface, and/or the incident area 121 and the second reflection area 122 includes the continuous curved surface. The first reflection area 111 may be the continuous curved surface constructed based on the first curved surface 110 of the continuous curved surface. A metal or metal alloy reflection layer with a nanometer or micrometer level is correspondingly disposed on the continuous curved surface. A thickness of the reflection layer does not affect that the reflective layer and the exit area 112 remain consistent and continuous curved surfaces, or at least one surface of the first reflection area 111 and the exit area 112 remain consistent and continuous curved surfaces. In some embodiments, the second reflection area 122 may be the continuous curved surface constructed based on the second curved surface 110 of the continuous curved surface. The metal or metal alloy reflection layer with the nanometer or micrometer level is correspondingly disposed on the continuous curved surface. The thickness of the reflection layer does not affect that the reflective layer and the incident area 121 remain consistent and continuous curved surfaces, or at least one surface of the reflective layer and the incident area 121 remain consistent and continuous curved surfaces.

As illustrated in FIG. 1, the incident area 121 is configured to receive the light rays from the display module 20, and the exit area 112 is configured to transmit the light rays towards the human eye. In response to "the first reflection area 111 surrounding the exit area 112 and the incident area 121 surrounding the second reflection area 122" (not shown in the figures), the display module 20 may be quadrilateral, annular, polygonal, etc. A shape of the display module 20 may be matched with the incident area 121.

In the optical module 10 of the embodiments of the present disclosure, at least one of the first curved surface 110 and the second curved surface 120 is the continuous curved surface, the first reflection area 111 and the exit area 112 include the continuous curved surface, and/or the incident area 121 and the second reflection area 122 include the continuous curved surface. Thus, the optical module 10 may be conveniently processed. In some embodiments, in response to the first curved surface 110 being the continuous curved surface, the first reflection area 111 and the exit area 112 may be processed together, and processing difficulty at the junction of the first reflection area 111 and the exit area 112 may be reduced. It reduces difficulty of coating the reflection areas on different surfaces (such as between the plane surface and the non-plane surface in the related art), thereby effectively avoiding the loss of light rays at the junction of the first reflection area 111 and the exit area 112, effectively preventing the preset path of light rays from being changed, and ensuring the imaging quality of the optical module 10. In some embodiments, in response to the second curved surface 120 being the continuous curved surface, the processing of the second curved surface 120 may also be simplified, so as to ensure the imaging quality of the optical module 10. In summary, the optical module 10 of the present disclosure has simplified processing operations, thereby reducing processing difficulty and costs.

In some embodiments, in response to the first curved surface 110 and the second curved surface 120 being spherical crown surfaces, a diameter of the first curved surface 110 and a diameter of the second curved surface 120 are less than or equal to 3 mm, so as to ensure lightweight of the optical module 10.

In the embodiments of the present disclosure, the incident area 121 and the exit area 112 are continuous curved surfaces, and may be constructed to allow the light rays to be refracted. Compared with a planar incident area and a planar exit area in the related art, in the present disclosure, the light rays from the display module 20 may be effectively collimated through the incident area 121 with the continuous curved surface, then collimated again through the exit area 112 with the continuous curved surface, and finally propagate to the human eye, which effectively improves central brightness of the display module 20 in a view field angle range under a visible pupil distance, resulting in higher optical efficiency. The reflection area (in the absence of specific instructions, it may refer to at least one of the first reflection area 111 and the second reflection area 122) reflects the light rays. An operating principle of the optical module 10 is roughly as follows. As illustrated in FIG. 4, the incident area 121 receives the light rays from the display module 20. After the light rays enter the substrate 100 from the incident area 121, the light rays propagate towards the first reflection area 111, then the light rays are reflected from the first reflection area 111 to the second reflection area 122, and finally the light rays are refracted through the exit area 112.

Although the number of the reflection areas in FIG. 4 is two, and the light rays inside the substrate 100 are reflected twice, the number of the reflection areas may also be greater than two as long as a volume of the optical module 10 is satisfied. In this case, the light rays inside the substrate 100 may have more than two reflections, thereby achieving more complete folding of the optical path. And at this point, the remaining reflection areas may be further disposed on the periphery of the current reflection area.

In the optical module 10 of the present disclosure, the first curved surface 110 and the second curved surface 120 are continuous curved surfaces. In some embodiments, the first curved surface 110 and the second curved surface 120 may be the continuous curved surfaces constituted by the same function. The first curved surface 110 and the second curved surface 120 may include a single function curved surface or a multi-function curved surface. The single function curved surface here is generated by a function, and during automatically processing the curved surface, only the same processing function and the same set of design parameters are needed. In this case, the optical module 10 may be further facilitated for designing and processing. In some embodiments, the continuous curved surface may be calculated using Zernike polynomials functions.

As illustrated in FIG. 4, orientation of the first curved surface 110 and orientation of the second curved surface 120 are the same. The first curved surface 110 and the second curved surface 120 are coaxial with respect to a central optical axis 30 of the display module 20. In this case, the light path formed between the two curved surfaces may be fully folded, so as to control the volume of the optical module 10 while ensuring the imaging quality. In some embodiments, the orientation of the first curved surface 110 and the orientation of the second curved surface 120 are different from each other. In FIG. 4, the first curved surface 110 and the second curved surface 120 are parallel to each other. In some embodiments, the first curved surface 110 and the second curved surface 120 may also intersect at edge positions of the first curved surface 110 and the second curved surface 120, and a middle part of the first curved surface 110 and a middle part of the second curved surface 120 are spaced apart from each other. That is, in the present disclosure, the first curved surface 110 and the second curved surface 120 are spaced apart from each other, including all cases where the first curved surface 110 and the second curved surface 120 do not fully adhere, such as the cases where the edge of the first curved surface 110 intersects with the edge of the second curved surface 120. On this basis, the substrate 100 of the present disclosure as a whole may be in the form of a column, a circular frustum, or an irregular shape, without any specific limitations. In FIG. 1, the exit area 112 and the first reflection area 111 are continuous, and the incident area 121 and the second reflection area 122 are continuous, which may improve utilization efficiency of the first curved surface 110 and the second curved surface 120. In some embodiments, the exit area 112 and the first reflection area 111 are spaced apart from each other, or the incident area 121 and the second reflection area 122 are spaced apart from each other. The first reflection area 111 and the second reflection area 122 at least partially overlap in a direction of the optical axis 30, to form an overlapping area. The overlapping area may fully receive the light rays from the incident area 121, which ensures that the light rays from the incident area 121 may fully enter the first reflection area 111 and then be effectively reflected to the second reflection area 122, thereby fully improving optical efficiency and effectively reducing the light loss of the display module 20.

In the embodiments of the present disclosure, as illustrated in FIG. 2 and FIG. 3, the first curved surface 110 and the second curved surface 120 include the spherical surface, the spherical crown surface, the free form surface, or the like (FIG. 2 and FIG. 3 are side views, thus the first curved surface 110 and the second curved surface 120 are displayed as circles in FIG. 2 and FIG. 3). In this case, a structure of the optical module 10 is relatively regular, which may be more convenient for processing and preparation. In some embodiments, the first curved surface 110 and the second curved surface 120 may also be centrosymmetric structures of other types besides the spherical crown surface, or the first curved surface 110 and the second curved surface 120 may also be other free form surfaces, etc. In response to the first curved surface 110 and the second curved surface 120 being the centrosymmetric structures, and the incident area 121, the first reflection area 111, the second reflection area 122, and the exit area 112 are all the centrosymmetric structures, it may ensure that entire optical path does not deviate from a center, thereby ensuring clearer imaging and higher imaging quality.

In the embodiments of the present disclosure, at least one of the first curved surface 110 and the second curved surface 120 has a maximum dimension in a transverse direction greater than a maximum dimension in a longitudinal direction of the first curved surface 110. As illustrated in FIG. 5 to FIG. 8, the maximum dimensions of the first curved surface 110 in the transverse direction is greater than those in the longitudinal direction, and the maximum dimensions of the second curved surface 120 in the transverse direction is greater than those in the longitudinal direction. The transverse direction corresponds to a Y coordinate direction in FIG. 6 and FIG. 8, and the longitudinal direction corresponds to a X coordinate direction in FIG. 6 and FIG. 8. For the human eye, the X coordinate corresponds to upper and lower view field directions of a human eye position where the optical module 10 is located, and the Y coordinate corresponds to the left and right view field directions of a human eye position where the optical module 10 is located. The optical module 10 is installed onto the near-eye display device, which may make an imaging area of the left and right view fields larger than an imaging area of the upper and lower view fields, thereby being more in line with characteristics of the human eye's view field and meets viewing needs of the human eye. That is, in FIG. 6, D2 is greater than D1. In FIG. 8, D4 is greater than D3. The maximum dimension of the first reflection area 111 and/or the exit area 112 in the transverse direction is greater than the maximum dimension of the first reflection area 111 and/or the exit area 112 in the longitudinal direction. The maximum dimension of the incident area 121 and/or the second reflection area 122 in the transverse direction is greater than the maximum dimension of the incident area 121 and/or the second reflection area 122 in the longitudinal direction. The transverse direction and the longitudinal direction may refer to the above description. The maximum dimension of the first reflection area 111 in the transverse direction is greater than the maximum dimension of the first reflection area 111 in the longitudinal direction, and the maximum dimension of the exit area 112 in the transverse direction is greater than the maximum dimension of the exit area 112 in the longitudinal direction. Alternatively, the maximum dimension of one of the first reflection area 111 and the exit area 112 in the transverse direction is greater than the maximum dimension of the one of the first reflection area 111 and the exit area 112 in the longitudinal direction. The maximum dimension of the incident area 121 in the transverse direction is greater than the maximum dimension of the incident area 121 in the longitudinal direction, and the maximum dimension of the second reflection area 122 in the transverse direction is greater than the maximum dimension of the second reflection area 122 in the longitudinal direction. Alternatively, the maximum dimension of one of the incident area 121 and the second reflection area 122 in the transverse direction is greater than the maximum dimension of the one of the incident area 121 and the second reflection area 122 in the longitudinal direction. Thus, the imaging area of the left and right view field is larger than the imaging area of the upper and lower view field, which facilitates for human observation.

Figure 9:
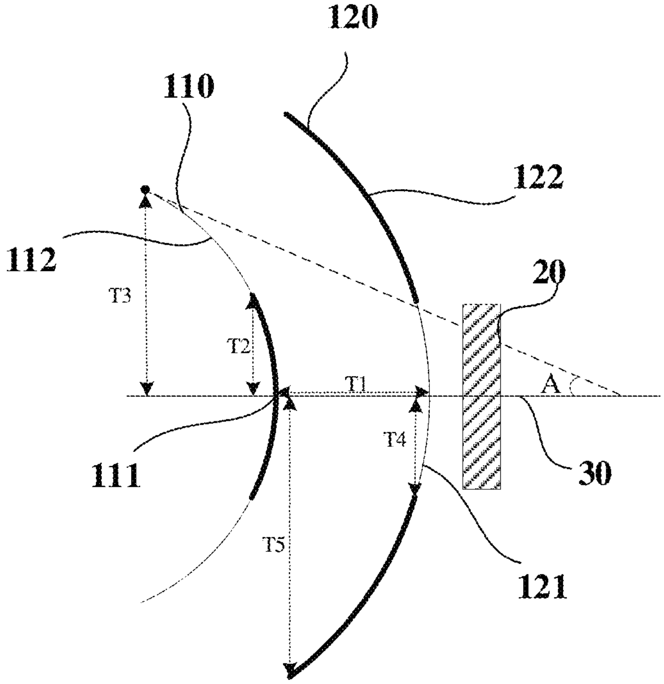
FIG. 9 is an operating schematic view of the optical module for the near-eye display device in some embodiments of the present disclosure.

In some embodiments of the present disclosure, as illustrated in FIG. 9, a distance between the first curved surface 110 and the second curved surface 120 along the central optical axis 30 is defined as T1, and T1 is taken as 1.48 mm±20%. That is, T1 is taken as a value in a range from 1.184 to 1.776. In this case, it may ensure that the optical path in optical module 10 is fully folded while also ensuring the lightweight of optical module 10.

Figure 6:
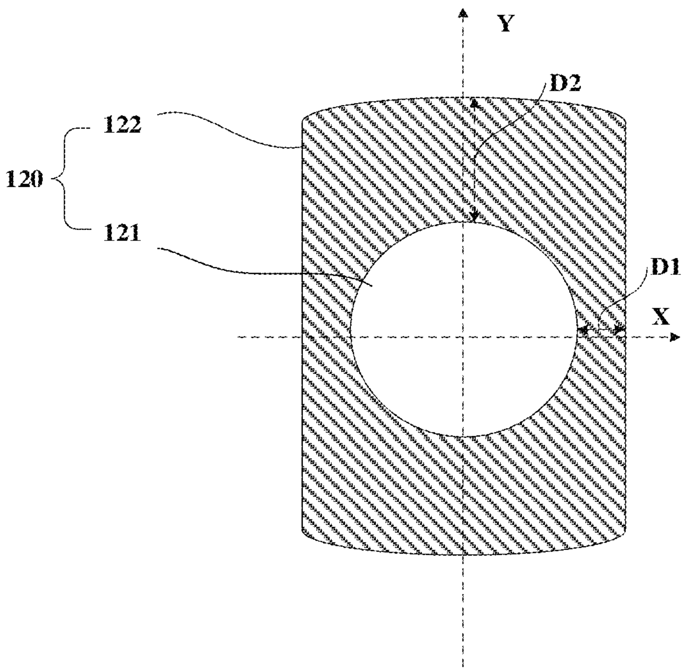
FIG. 6 is a structural schematic view of the second curved surface in FIG. 5.

In some embodiments of the present disclosure, the incident area 121, the second reflection area 122, the first reflection area 111, and the exit area 112 are all coaxial with the display module 20 with respect to the central optical axis 30. As illustrated in FIG. 2 and FIG. 3, or, as illustrated in FIG. 6 and FIG. 8, in the direction of the central optical axis 30, an orthographic projection of the incident area 121 falls in an orthographic projection of the first reflection area 111. That is, an orthographic projection area of the incident area 121 is smaller than an orthographic projection area of the first reflection area 111, so that the first reflection area 111 may fully receive the light rays emitted from the display module 20 and reflect all the light rays to the second reflection area 122. In the present disclosure, "orthographic projection" refers to a projection of a corresponding area (in the absence of specific instructions, it may refer to at least one of the incident area 121, the first reflection area 111, the second reflection area 122, and the exit area 112) along the central optical axis 30 on a plane perpendicular to the central optical axis 30.

As illustrated in FIG. 2 and FIG. 3, or as illustrated in FIG. 6 and FIG. 8, along the direction of the central optical axis 30, an orthographic projection of the exit area 112 falls in an orthographic projection of the second reflection area 122. That is, an orthographic projection area of the exit area 112 is smaller than an orthographic projection area of the second reflection area 122, thereby effectively limiting the light rays of the optical module 10 and meeting set view field angle or view of field (FOV) angle requirements.

As illustrated in FIG. 9, the incident area 121, the first reflection area 111, the second reflection area 122, and the exit area 112 are all centrosymmetric structures, the maximum distance between the exit area 112 and the central optical axis 30 is defined as T3, the maximum distance between the first reflection area 111 and the central optical axis 30 is defined as T2, the maximum distance between the second reflection area 122 and the central optical axis 30 is defined as T5, and the maximum distance between the incident area 121 and the central optical axis 30 is defined as T4, and T5>T3>T2>T4. By limiting the relationship between T1, T2, T3, and T4, the optical transmission efficiency and brightness may be improved.

In some embodiments of the present disclosure, T2 takes a value of 1.05 mm±20%, which means T2 takes a value in a range from 0.84 mm to 1.26 mm. T3 takes a value of 1.96 mm±20%, which means T3 takes a value in a range from 1.568 mm to 2.352 mm. T4 takes a value of 1.32 mm±20%, which means that T4 takes a value in a range from 1.056 mm to 1.584 mm. T5 takes a value of 2.7 mm±20%, which means that T5 takes a value in a range from 2.16 mm to 3.244 mm. Thus, miniaturization and lightweighting of the optical module 10 may be achieved, and it is convenient to install the optical module 10 on relevant near-eye display device.

In some embodiments of the present disclosure, T2 is too small, which may cause insufficient reflection of light rays from the display module 20 in the first reflection area 111, leading to low light output efficiency. T2 is too large, which may cause the area of the first reflection area 111 to be too large, and cause the area of the exit area 112 to be too small, thereby easily leading to dark areas. In response to T2 taking the value in the range from 0.84 mm to 1.26 mm, it may achieve both light output efficiency and uniform light output.

As illustrated in FIG. 2 and FIG. 3, or as illustrated in FIG. 6 and FIG. 8, the orthogonal projections of the incident area 121, the second reflection area 122, the first reflection area 111, and the exit area 112 may all be circular, elongated, elliptical, regular polygon, or any other shape, without any specific restrictions. The shape of the incident area 121 may be similar to the shape of the first reflection area 111, for example, the contours of the incident area 121 and the first reflection area 111 are both circular, elliptical, or regular polygons. The shape of the second reflection area 122 may be similar to the shape of the exit area 112, so that the light rays of the display module 20 are fully reflected and utilized, thereby achieving better imaging quality and light output efficiency.

In some embodiments of the present disclosure, parts of the substrate 100 corresponding to the incident area 121 and the exit area 112 may also be prepared using anisotropic materials, so that the incident area 121 and the exit area 112 only allow the light rays to unidirectionally pass. That is, the incident area 121 only allows the light rays to propagate from the display module 20 towards the interior of the substrate 100, while the exit area 112 only allows the light rays to propagate from the second reflection area 122 towards the exterior of the exit area 112, thereby avoiding the leakage of the light rays in the substrate 100 from the incident area 121, preventing external light rays from entering the substrate 100 from the exit area 112, and ensuring the effectiveness of the optical module 10.

In some embodiments of the present disclosure, as illustrated in FIG. 1, a convex surface of the incident area 121 faces the display module 20, and a concave surface of the exit area 112 faces the human eye. The convex surface of the incident area 121 faces the display module 20, and the incident area 121 may play a focusing role, thereby facilitating the convergence of the light rays from the display module 20 and improving the utilization of the light rays from the edge position of the display module 20 or a position close to the edge position of the display module 20. The form of the display module 20 is not limited, considering its compatibility with the incident area 121, the display module 20 may adopt a curved screen structure. In addition, the concave surface of the exit area 112 faces the human eye, which may not only shrink the light rays towards the central optical axis 30 to ensure the view field angle, but also improve the utilization of the light rays from the edge position of the display module 20 or the position close to the edge position of the display module 20. It may also adapt to curvature of the human eye as much as possible, thereby ensuring the comfort of the human eye. During installing the display module 20 onto the near-eye display device, taking glasses as an example, since lens and a frame of the glasses generally have curvature, it is convenient to achieve the display module 20 to be flush with an outer surface of the lens or the frame.

In some embodiments of the present disclosure, the reflection area (in the absence of specific instructions, it may refer to at least one of the first reflection area 111 and the second reflection area 122) may be obtained by coating on a corresponding position of the substrate 100. In some embodiments, the first reflection layer is coated on the first curved surface 110, and the second reflection layer is coated on the second curved surface 120. In some embodiments, the reflection area may also be formed by directly preparing using reflective materials on the corresponding position of the substrate 100. In some embodiments, as illustrated in FIG. 1, the first curved surface 110 and the second curved surface 120 are coaxial, the first curved surface 110 has a central area and a peripheral area located periphery of the central area, and only the central area of the first curved surface 110 is coated to form the first reflection area 111. The second curved surface 120 has a central area and a peripheral area located periphery of the central area, and only the peripheral area of the second curved surface 120 is coated to form the second reflection area 122.

The first reflective layer and the second reflective layer may be disposed inside the substrate 100 or on an outer surface of the substrate 100. The first reflective layer and the second reflective layer are disposed inside the substrate 100, which may sufficiently protect the first reflective layer and the second reflective layer to prevent scratching and wear. The first reflection layer and the second reflection layer are disposed outside the substrate 100, that is, the first reflection layer is located on a side of the substrate 100 facing the human eye, and the second reflection layer is located on a side of the substrate 100 facing the display module 20, which may facilitate the processing and preparation of the first reflection layer and the second reflection layer. In some embodiments, a film may be directly placed on an outer surface of the first curved surface 110 using processes, such as vapor deposition, sputtering, or the like.

In some embodiments of the present disclosure, a structural form of the substrate 100 is not limited, as long as the first curved surface 110 and the second curved surface 120 may be formed. In some embodiments, the substrate 100 may be a solid substrate 100 prepared by the same material. In some embodiments, the substrate 100 is prepared by glass or resin, etc. In this case, the first curved surface 110 and the second curved surface 120 of the substrate 100 may be obtained by cutting, injection molding, or other processes. The substrate 100 may ensure that the light rays uniformly propagate in the same medium, thereby reducing light loss. In some embodiments, the substrate 100 may also be formed by enclosing using multiple plates, multiple plates enclose to form a cladding, and the interior of the cladding may be filled with the medium, or the interior of the cladding may also be hollow. The interior of the cladding is hollow, which may reduce the weight of the optical module 10, thereby facilitating installation of the optical module 10 on the near-eye display devices. In addition, hollow substrate 100 may also reduce the use of raw materials, which is beneficial for improving overall production process. Adjacent plates may be connected and assembled together by bonding or other means.

Figure 5:
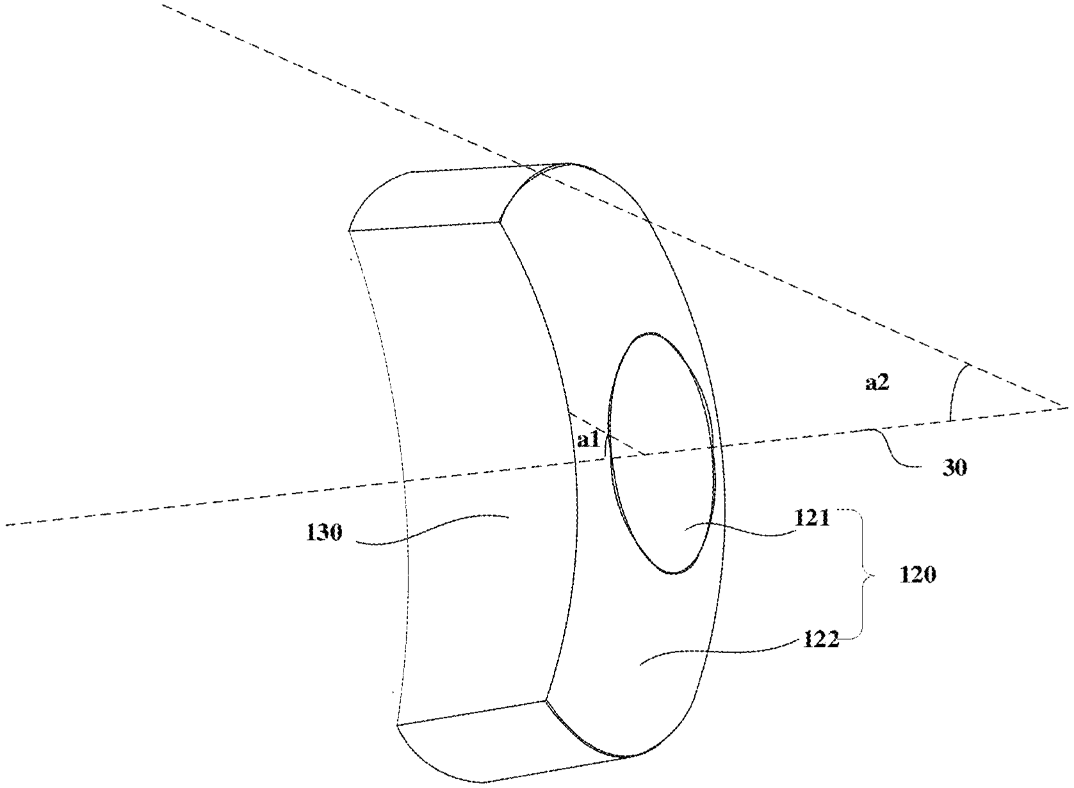
FIG. 5 is a structural schematic view of the optical module for the near-eye display device in some embodiments of the present disclosure.
Figure 7:
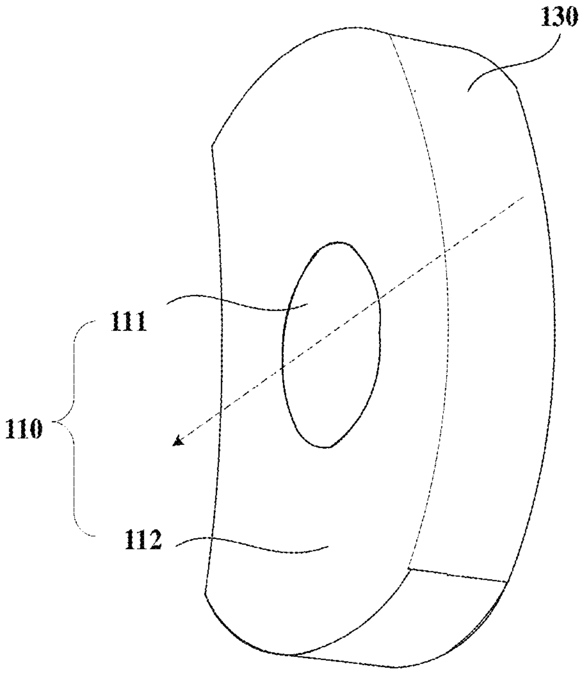
FIG. 7 is a structural schematic view of the optical module for the near-eye display device in some embodiments of the present disclosure.
Figure 8:
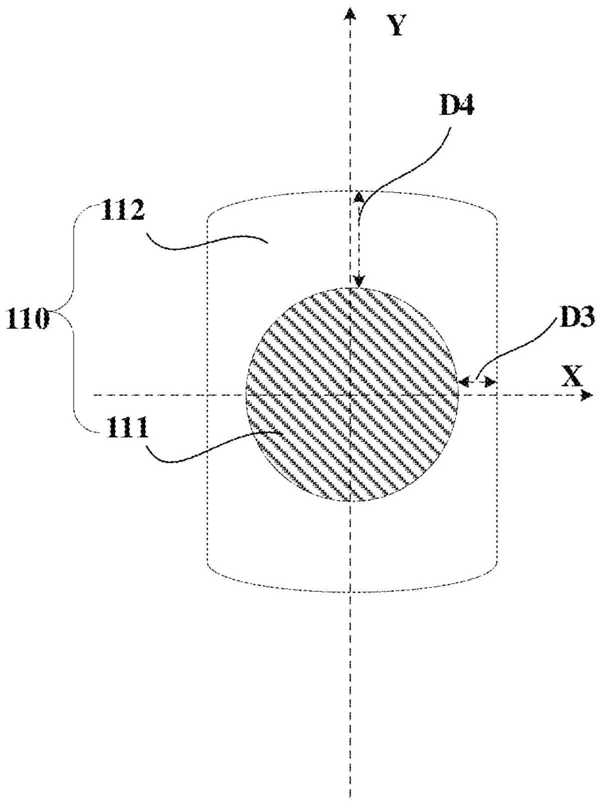
FIG. 8 is a structural schematic view of the first curved surface in FIG. 7.

In some embodiments of the present disclosure, As illustrated in FIG. 5 and FIG. 7, the substrate 100 further includes a side wall surface 130, and the side wall surface 130 is connected to the first curved surface 110 and the second curved surface 120. The side wall surface 130 is provided with an opaque layer, so as to prevent the light rays from leaking out from the side wall surface 130 and reduce the light loss of the optical module 10. In FIG. 5 and FIG. 7, the side wall surface 130 is parallel to the central optical axis 30. In some embodiments, along a light propagating direction of the central optical axis 30, the side wall surface 130 may also gradually approach the central optical axis 30. In this case, the light rays may be further effectively converged. The side wall surface 130 may be a stepped surface or a conical surface.

In some embodiments of the present disclosure, the side surface 130 may be provided with a third reflective layer by the processes, such as coating or the like. Alternatively, a part of the substrate 100 corresponding to the side wall surface 130 may also be directly prepared using reflective materials. The third reflective layer, the first reflective layer, and the second reflective layer may be made of metal or metal alloy materials, such as aluminum, silver, a mixture of aluminum and silver, or the like. Alternatively, the opaque layer may also be made of black epoxy resin, black silicone rubber, carbon black, nickel black, black chromium, Vanta black, or the like.

In some embodiments of the present disclosure, as illustrated in FIG. 9, in the optical module 10 of the near-eye display device, the first curved surface 110 and the second curved surface 120 have the same central axis, which is the central optical axis 30. As illustrated in FIG. 2, the exit area 112 is in a continuous curved shape, that is, the entire exit area 112 is formed by processing the continuous curved surface, such as the spherical surface, the free form surface, or the like. An angle A between the tangent line of the outer edge of the exit area 112 and the central optical axis 30 ranges from 25° to 30°.

In some embodiments of the present disclosure, the exit area 112 is curved and the angle A of the exit area 112 is limited. Thus, the exit area 112 may concentrate the light rays towards the central optical axis 30, thereby improving the brightness and the view field angle of the optical module 10. In response to the angle A being too large, the light rays emitted from the exit area 112 is more divergent, resulting in lower brightness of the display module 20. In response to the angle A being too large, the exit area 112 is too smooth, which is not conducive to the first reflection area 111 reflecting the light rays to the second reflection area 122. In response to the angle A being too small, the exit area 112 is too curved. In this case, the exit area 112 does not emit enough light rays, which is not conducive to forming an angle that meets the view field angle of the human eye. The angle A of the present disclosure may maximize the balance between the brightness and the view field angle of the display module 20, and improve the imaging effect of the optical module 10. In addition, the angle A in the present disclosure is beneficial for the processing and production of the display module 20.

On the basis of the above, the incident area 121 may also be curved like the exit area 112. The incident area 121 is curved, which may concentrate the light rays. The curved surface of the exit area 112 and the curved surface of the incident area 121 may be parts of relatively regular spherical surfaces (such as the spherical crown surfaces), ellipsoidal, or even irregular surfaces, as long as the curved surface of the exit area 112 and the curved surface of the incident area 121 may improve the imaging effect.

In response to the exit area 112 being not the centrosymmetric structure, the outer edge of the exit area 112 has a longitudinal pole along the longitudinal direction and has a transverse pole along the transverse direction. As illustrated in FIG. 5, an angle between a first tangent of the longitudinal pole and the central optical axis 30 is defined as a1, and an angle between a second tangent of the transverse pole and the central optical axis 30 is defined as a2, and a1 is greater than a2. It is equivalent to the fact that the maximum transverse dimension of the first curved surface 110 is greater than the maximum longitudinal dimension of the first curved surface 110, so as to be more in line with the characteristics of the human eye's view field and meet the viewing needs of the human eye.

Figure 11:
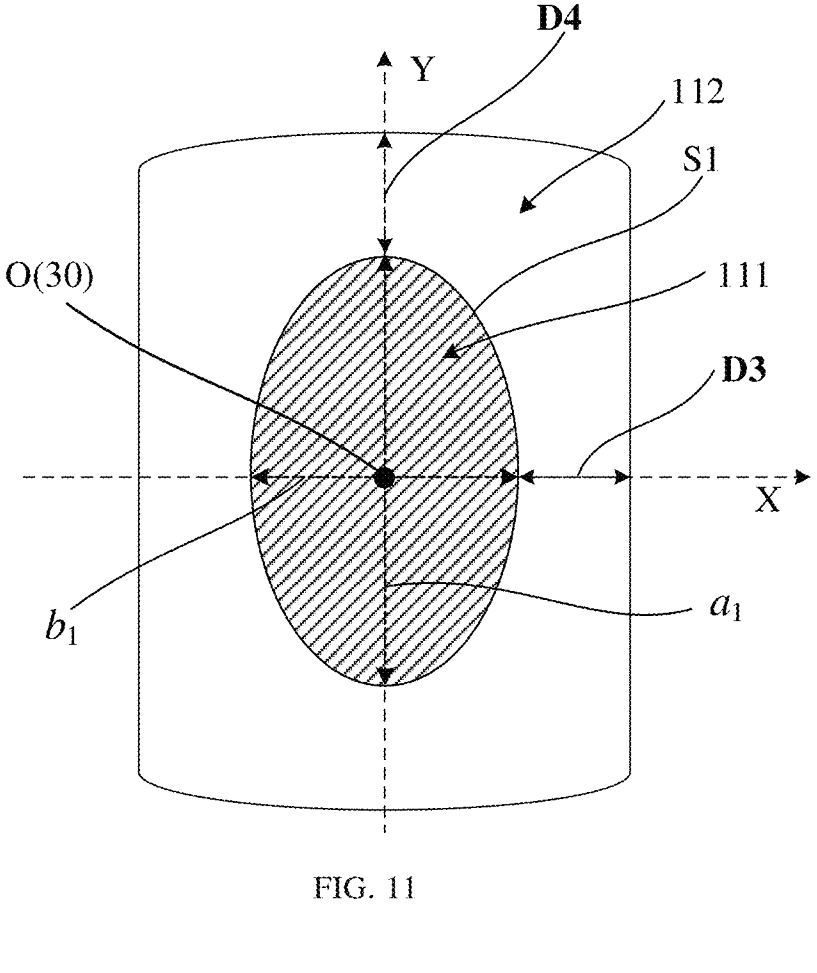
FIG. 11 is a structural schematic view of the first curved surface in some embodiments of the present disclosure.
Figure 12:
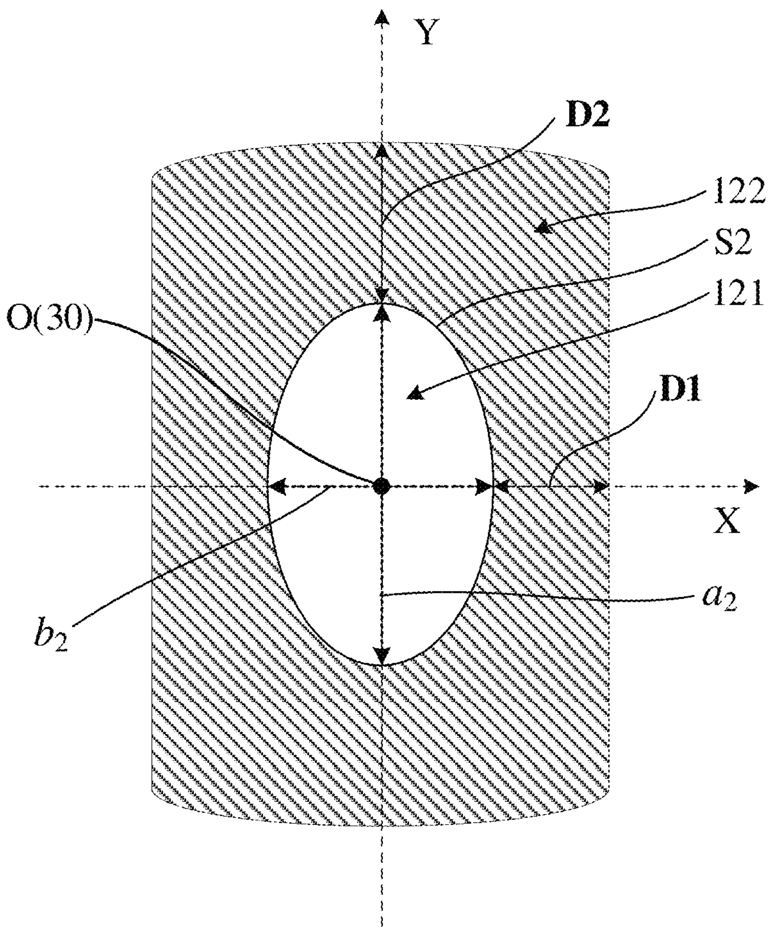
FIG. 12 is a structural schematic view of the second curved surface in some embodiments of the present disclosure.

As illustrated in FIGS. 11-12, FIG. 11 is a structural schematic view of the first curved surface in some embodiments of the present disclosure, and FIG. 12 is a structural schematic view of the second curved surface in some embodiments of the present disclosure. In some embodiments of the present disclosure, the optical module 10 of the near-eye display device includes the substrate 100. The substrate 100 includes the first curved surface 110 and the second curved surface 120 spaced apart from each other. The first curved surface 110 includes the first reflection area 111 and the exit area 112 located on periphery of the first reflection area 111. The second curved surface 120 includes the incident area 121 and the second reflection area 122 located on periphery of the incident area 121. At least one of the first curved surface 110 and the second curved surface 120 is the continuous curved surface. The incident area 121 is configured for receiving light rays from the display module 20, the light rays sequentially pass through the incident area 121, the first reflection area 111, the second reflection area 122, and are emitted from the exit area 112. The exit area 112 is configured for transmitting the light rays towards human eye. A shape of a projection of each of the first reflection area 111 and the incident area 121 in a first direction is an ellipse.

The shape of the projection of the first reflection area 111 in the first direction is defined as a first ellipse S1, and the first ellipse S1 includes a first major axis a1 and a first minor axis b1 that are perpendicular to each other. The shape of the projection of the incident area 121 in the first direction is defined as a second ellipse S2, and the second ellipse S2 includes a second major axis a2 and a second minor axis b2 that are perpendicular to each other. The first major axis a1 and the second major axis a2 are parallel to each other, and the first minor axis b1 and the second minor axis b2 are parallel to each other. In the first direction, an area of the projection of the first reflection area 111 is greater than or equal to an area of the projection of the incident area 121. The first direction can be a direction along the central optical axis 30, such as the direction from the first curved surface 110 to the second curved surface 120 along the central optical axis 30. That is, the first direction is parallel to the central optical axis 30. The first major axis a1 is flush with the second major axis a2, and the first minor axis b1 is flush with the second minor axis b2. That is, a center of the first ellipse S1 is flush with a center of the second ellipse S2.

The substrate 100 has the central optical axis 30, and a Cartesian coordinate system is constructed with the central optical axis 30 as an origin. In the Cartesian coordinate system, the shape of the projection of the first reflection area 111 satisfies an equation:

$$\frac{y^2}{a_1^2} + \frac{x^2}{b_1^2} = 1,$$

and $\alpha_1 > b_1 > 0$.

The shape of the projection of the incident area 121 satisfies an equation:

$$\frac{y^2}{a_2^2} + \frac{x^2}{b_2^2} = 1,$$

and $\alpha_2 > b_2 > 0$.

A length of each of the first major axis a1 and the second major axis a2 is 3 mm±0.5 mm, and a length of each of the first minor axis b1 and the second minor axis b2 is 2 mm±0.4 mm. An eccentricity of the first ellipse S1 is equal to that of the second ellipse S2.

In some embodiments, in a plane perpendicular to the central optical axis 30, the central optical axis 30 appears as a point. Each of the incident area 121, the first reflection area 111, the second reflection area 122, and the exit area 112 is point-symmetric with respect to the point. The first reflection area 111 is axially symmetric with respect to the first major axis a1 and the first minor axis b1. The incident area 121 is axially symmetric with respect to the second major axis a2 and the second minor axis b2.

In some embodiments, a shape of a projection of the exit area 112 in the first direction is a first closed shape, and the first closed shape is formed by surrounding though using two opposite straight edges and two opposite curved edges. A shape of a projection of the second reflection area 122 in the first direction is a second closed shape, and the second closed shape is formed by surrounding though using two opposite straight edges and two opposite curved edges. The setting of the straight edges may facilitate processing, reduce costs, and facilitate assembling. The setting of the curved edges may facilitate processing. In some embodiments, the curved edges may be circular arc edges, etc.

In some embodiments, a first distance D1 from a boundary of the incident area 121 to a boundary of the second reflection area 122 along an X-axis of the Cartesian coordinate system is less than a second distance D2 from a boundary of the incident area 121 to a boundary of the second reflection area 122 along a Y-axis of the Cartesian coordinate system. A third distance D3 from a boundary of the first reflection area 111 to a boundary of the exit area 112 along the X-axis of the Cartesian coordinate system is less than a fourth distance D4 from a boundary of the first reflection area 111 to a boundary of the exit area 112 along the Y-axis of the Cartesian coordinate system. Each of the first distance D1 and the third distance D3 is 2 mm±0.5 mm, and each of the second distance D2 and the fourth distance D4 is 1 mm±0.4 mm.

The shape of the projection of each of the first reflection area 111 and the incident area 121 in the first direction is the ellipse. That is, the central areas of the first curved surface 110 and the second curved surface 120 are elliptical, which may be coordinated with elliptical masks or elliptical shields, so that the first reflection area 111 is coated and the incident area 121 is not coated. Moreover, the central areas of the first curved surface 110 and the second curved surface 120 may form the elliptical shapes without precisely cutting material. The exit area 112 is a periphery area of the first reflection area 111, and the second reflection area 122 is a periphery area of the incident area 121. If the exit area 112 and the second reflection area 122 are designed to be elliptical, it would require very precise elliptical molds or cutting processes, which may increase manufacturing costs. Thus, considering the feasibility of actual production and manufacturing, the shape requirements for the periphery areas can be appropriately reduced, so as to reduce the costs.

Figure 10:
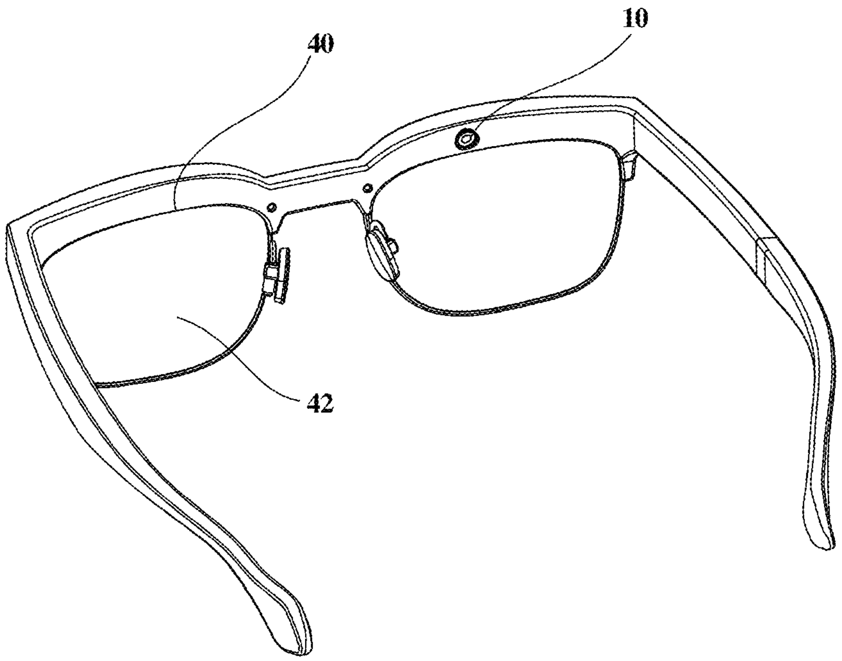
FIG. 10 is a structural schematic view of the near-eye display device in some embodiments of the present disclosure.

As illustrated in FIG. 10, the near-eye display device in some embodiments of the present disclosure includes a device body 40, a lens 42, the display module 20 (not separately shown in FIG. 10), and the optical module 10. The lens 42 may be located on the device body 40. Alternatively, the lens 42 has a connection relationship with the device body 40. The device body 40 and the lens 42 may be components on wearable devices, such as head mounted displays, smart glasses, augmented reality glasses, helmets, near/far vision glasses, goggles, or the like. The near-eye display device may be the wearable device, such as a head mounted display, smart glasses, augmented reality glasses, or the like. In this case, the device body 40 is a wearable body. In some embodiments, the specific form of the near-eye display device is not limited by the examples provided here. In some embodiments, the near-eye display devices may also be projection devices or handheld devices.

In some embodiments of the present disclosure, the display module 20 may adopt a micro display, such as, a Micro Light-Emitting Diode (Micro-LED), an ultra Light-Emitting Diode (uLED), a Micro Organic Light-Emitting Diode (Micro-OLED), a Liquid Crystal On Silicon (LCoS), a Liquid Crystal Display (LCD), a Digital Micromirror Device (DMD)/Digital Light Processing (DLP), a Laser Beam Scanning (LBS), or any combination of these types of displays. The micro display may produce the light rays and provide image sources, such as texts, videos, information prompts, or the like.

The micro display is usually smaller and lighter, and configured for shorter distance between the eyes and the display screen, so that a user may clearly see displayed content in response to wearing the device. The micro display is suitable for being integrated into the device, such as the glasses or the helmet, so as to achieve portable and convenient display needs. Because the micro display is placed near the user's eyes, the micro display typically has high resolution and pixel density, so as to ensure image clarity and detail, as well as high contrast, fast response, and low power consumption.

In some embodiments of the present disclosure, the optical module 10 may be combined with existing ordinary glasses, such as hyperopia glasses, myopia glasses, goggles, sports glasses, or various smart head mounted near-eye display devices, so as to achieve enhanced display function, thereby enabling the ordinary glasses to have the augmented reality function of smart glasses.

In some embodiments of the present disclosure, the optical module 10 may be installed on the lens 42 or the frame, and the number of the optical module 10 may be one or more. In some embodiments, it may be a binocular design for the left and right eyes. In some embodiments, the optical module 10 may be detachably connected to the lens 42 and/or the frame. In some embodiments, the optical module 10 may be fixed to the lens 42 and/or the frame by means of a back clip or magnetic suction. In some embodiments, the lens 42 may be different types of lenses, such as the hyperopia glasses, the myopia glasses, the goggles, the sports glasses, sunglasses, or the like.

In some embodiments of the present disclosure, in response to the optical module 10 being disposed on the lens 42 or the frame, the curvature of the positions of the lens 42 or the frame corresponding to the optical module 10 may correspond to the curvature of the first curved surface 110 and the curvature of the second curved surface 120, thereby enabling the optical module 10 to be hidden on the device body 40, ensuring the aesthetics of the near-eye display device.

In some embodiments of the present disclosure, the display module 20 and the optical module 10 may be fixed and encapsulated together, and then fixed to the device body 40. In this case, the display module 20 and the optical module 10 may be fixed by bonding, or the display module 20 and the optical module 10 may be directly pressed and fixed together. In addition, a backplane (not shown in the figures) may be disposed on a side of the display module 20 facing away from the optical module 10. The backplane may be a circuit board or other driver board, which may be rigid or flexible. The backplane is configured to connect a driver power supply and provide electrical drive for the display module 20. The backplane may be larger than or equal to the display module 20 for easy connection of external electrical components. In some embodiments, a dimension of the backplane may also be matched with the dimension of the display module 20, so as to ensure a more regular shape and facilitate subsequent packaging. On this basis, a non-transparent protective layer may be further filled between the backplane and the optical module 10, so as to ensure structural stability and prevent light leakage. In addition, a protective layer (not shown in the figures) may also be disposed on the first curved surface 110 corresponding to the optical module 10. The protective layer is made of a light-transmitting material, which does not change the original propagation path of the light rays. The protective layer may protect the exit area 112 and the first reflection area 111, reduce wear on the first curved surface 110, and also reduce the possibility of dust and other debris adhering to the first curved surface 110 affecting reflection or transmission efficiency of the first curved surface 110.

In some embodiments, the display module 20 and the optical module 10 may also be fixed separately or as a whole to the device body 40, which facilitates the independent disassembly and replacement of the display module 20. Furthermore, after the optical module 10 is embedded inside the device body 40, the probability of the optical module 10 failure is very low, which facilitates the maintenance of the near-eye display device.

In the optical module for the near-eye display device in some embodiments of the present disclosure, at least one of the first curved surface and the second curved surface is the continuous curved surface. Thus, the optical module may be conveniently processed. In some embodiments, in response to the first curved surface being the continuous curved surface, the first reflection area and the exit area may be processed together, and processing difficulty at the junction of the first reflection area and the exit area may be reduced, thereby avoiding the loss of light rays at the junction of the first reflection area and the exit area, effectively preventing the preset path of light rays from being changed, and ensuring the imaging quality of the optical module. In some embodiments, in response to the second curved surface being the continuous curved surface, the processing of the second curved surface may also be simplified, so as to ensure the imaging quality of the optical module. In summary, the optical module for the present disclosure has simplified processing operations, thereby reducing processing difficulty and costs.

The near-eye display device includes the optical module. Thus, the near-eye display device has all technical effects of the optical module, which may not be repeated here.

In the description of the embodiments of the present disclosure, the directions or positional relationships indicated by the terms, “central”, “longitudinal”, “transverse”, “up”, “down”, “front”, “back”, “left”, “right”, “vertical”, “horizontal”, “top”, “bottom”, “inside”, “outside”, etc. are based on the methods or positional relationships shown in the accompanying drawings. It is only intended to facilitate the description of the embodiments of the present disclosure and simplify the description, but does not indicate or imply that the device or the element referred to must have a specific orientation, be constructed and operated in a specific orientation. Therefore, it cannot be understood as a limitation on the embodiments of the present disclosure. The terms “first”, “second”, and “third” in the present disclosure are only configured to describe purposes and cannot be understood as indicating or implying relative importance.

In the description of the embodiments of the present disclosure, it should be noted that unless otherwise expressly specified and limited, the terms “connecting” and “connection” should be broadly understood. For example, it may be a fixed connection, a detachable connection, or an integrated connection; it may be a mechanical connection or an electrical connection; it may be a direct connection or an indirect connection through an intermediate medium. For those of ordinary skill in the art, the specific meanings of the above terms may be understood according to specific circumstances.

In the embodiments of the present disclosure, unless otherwise specified and limited, a first feature is above or below a second feature, which means that the first feature may be in direct contact with the second feature, or the first feature may be in indirect contact with the second feature through an intermediate medium. Moreover, the first feature is above the second feature, which means that the first feature is directly above or slantly above the second feature, or simply indicates that a horizontal height of the first feature is greater than a horizontal height of the second feature. The first feature is below the second feature, which means that the first feature is directly below or slantly below the second feature, or simply indicates that the horizontal height of the first feature is less than the horizontal height of the second feature.

In the description of the present disclosure, the reference terms “an embodiment”, “some embodiments”, “examples”, “specific examples”, or “some examples” mean that specific features, structures, materials, or features described in conjunction with the embodiments or examples may be included in at least one embodiment or example of the present disclosure. In the present specification, the illustrative expressions of the above terms do not necessarily refer to the same embodiments or examples. Moreover, the specific features, structures, materials, or characteristics described may be combined in an appropriate manner in any one or more embodiments or examples. In addition, without mutual contradiction, those of skilled in the art may combine the different embodiments or examples, and combine the features of the different embodiments or examples described in the present specification.

The above embodiments are only configured to illustrate the technical solutions of the present disclosure, but not to limit the technical solutions. Although the present disclosure has been described in detail with reference to the foregoing embodiments, those of ordinary skill in the art will understand that the technical solutions described in the foregoing embodiments may still be modified or some of the technical features may be equivalently replaced. However, these modifications or replacements do not drive the essence of the corresponding technical solutions to depart from the spirit and scope of the technical solutions of the embodiments of the present disclosure.

What is claimed is:

1. An optical module for a near-eye display device, comprising:

a substrate, comprising a first curved surface and a second curved surface spaced apart from each other;

wherein the first curved surface comprises a first reflection area and an exit area located on periphery of the first reflection area, the second curved surface comprises an incident area and a second reflection area located on periphery of the incident area, at least one of the first curved surface and the second curved surface is a continuous curved surface;

the incident area is configured for receiving light rays from a display module, the light rays sequentially pass through the incident area, the first reflection area, the second reflection area, and are emitted from the exit area; the exit area is configured for transmitting the light rays towards human eye; and a shape of a projection of each of the first reflection area and the incident area in a first direction is an ellipse.

2. The optical module for the near-eye display device according to claim 1, wherein the shape of the projection of the first reflection area in the first direction is defined as a first ellipse, and the first ellipse comprises a first major axis and a first minor axis that are perpendicular to each other;

the shape of the projection of the incident area in the first direction is defined as a second ellipse, and the second ellipse comprises a second major axis and a second minor axis that are perpendicular to each other; and the first major axis and the second major axis are parallel to each other, and the first minor axis and the second minor axis are parallel to each other; and in the first direction, an area of the projection of the first reflection area is greater than or equal to an area of the projection of the incident area.

3. The optical module for the near-eye display device according to claim 2, wherein the substrate has a central optical axis, and a Cartesian coordinate system is constructed with the central optical axis as an origin;

in the Cartesian coordinate system, the shape of the projection of the first reflection area satisfies an equation:

$$\frac{y^2}{a_1^2} + \frac{x^2}{b_1^2} = 1,$$

and $\alpha_1 > b_1 > 0$;

the shape of the projection of the incident area satisfies an equation:

$$\frac{y^2}{a_2^2} + \frac{x^2}{b_2^2} = 1,$$

and $\alpha_2 > b_2 > 0$;

a length of each of the first major axis and the second major axis is 3 mm±0.5 mm, and a length of each of the first minor axis and the second minor axis is 2 mm±0.4 mm; and an eccentricity of the first ellipse is equal to that of the second ellipse.

4. The optical module for the near-eye display device according to claim 1, wherein in a plane perpendicular to the central optical axis, the central optical axis appears as a point; and each of the incident area, the first reflection area, the second reflection area, and the exit area is point-symmetric with respect to the point; and the first reflection area is axially symmetric with respect to the first major axis and the first minor axis, and the incident area is axially symmetric with respect to the second major axis and the second minor axis.

5. The optical module for the near-eye display device according to claim 3, wherein a shape of a projection of the exit area in the first direction is a first closed shape, and the first closed shape is formed by surrounding though using two opposite straight edges and two opposite curved edges;

a shape of a projection of the second reflection area in the first direction is a second closed shape, and the second closed shape is formed by surrounding though using two opposite straight edges and two opposite curved edges;

a first distance from a boundary of the incident area to a boundary of the second reflection area along an X-axis of the Cartesian coordinate system is less than a second distance from a boundary of the incident area to a boundary of the second reflection area along a Y-axis of the Cartesian coordinate system;

a third distance from a boundary of the first reflection area to a boundary of the exit area along the X-axis of the Cartesian coordinate system is less than a fourth distance from a boundary of the first reflection area to a boundary of the exit area along the Y-axis of the Cartesian coordinate system;

each of the first distance and the third distance is 2 mm±0.5 mm; and each of the second distance and the fourth distance is 1 mm±0.4 mm.

6. The optical module for the near-eye display device according to claim 1, wherein the first curved surface and the second curved surface are continuous curved surfaces, each of the first reflection area and the exit area comprises a continuous curved surface, and/or each of the incident area and the second reflection area comprises the continuous curved surface, and the continuous curved surface comprises a single function curved surface; and/or, a solid transmission medium is disposed between the first curved surface and the second curved surface.

7. The optical module for the near-eye display device according to claim 1, wherein orientation of the first curved surface and orientation of the second curved surface are the same, and the first curved surface and the second curved surface are coaxial with respect to a central optical axis of the display module; the first curved surface and the second curved surface comprises one or a combination of a spherical surface or a free form surface; and in a direction of the central optical axis, the first reflection area and the second reflection area at least partially overlap.

8. The optical module for the near-eye display device according to claim 7, wherein the first curved surface and the second curved surface are calculated using a Zernike polynomials function, a maximum distance between the exit area and the central optical axis is defined as T3, a maximum distance between the first reflection area and the central optical axis is defined as T2, a maximum distance between the second reflection area and the central optical axis is defined as T5, a maximum distance between the incident area and the central optical axis is defined as T4, and T5>T3>T2>T4.

9. The optical module for the near-eye display device according to claim 7, wherein a convex surface of the incident area faces the display module, a concave surface of the exit area faces the human eye, a maximum dimension of the first curved surface in a transverse direction is greater than a maximum dimension of the first curved surface in a longitudinal direction, and a maximum dimension of the second curved surface in a transverse direction is greater than a maximum dimension of the second curved surface in a longitudinal direction.

10. The optical module for the near-eye display device according to claim 1, wherein the substrate is provided with a first reflective layer and a second reflective layer, the first reflective layer is disposed on the first curved surface to form the first reflection area, and the second reflective layer is disposed on the second curved surface to form the second reflection area; and the first reflective layer is located on a side of the substrate facing the human eye, and the second reflective layer is located on a side of the substrate facing the display module.

11. A near-eye display device, comprising:

a device body;

a display module configured for emitting light rays; and an optical module, wherein the display module and the optical module are installed on the device body; and the optical module comprises:

a substrate, comprising a first curved surface and a second curved surface spaced apart from each other;

wherein the first curved surface comprises a first reflection area and an exit area located on periphery of the first reflection area, the second curved surface comprises an incident area and a second reflection area located on periphery of the incident area, at least one of the first curved surface and the second curved surface is a continuous curved surface;

the incident area is configured for receiving light rays from the display module, the light rays sequentially pass through the incident area, the first reflection area, the second reflection area, and are emitted from the exit area; the exit area is configured for transmitting the light rays towards human eye; and a shape of a projection of each of the first reflection area and the incident area in a first direction is an ellipse.

12. The near-eye display device according to claim 11, wherein the shape of the projection of the first reflection area in the first direction is defined as a first ellipse, and the first ellipse comprises a first major axis and a first minor axis that are perpendicular to each other;

the shape of the projection of the incident area in the first direction is defined as a second ellipse, and the second ellipse comprises a second major axis and a second minor axis that are perpendicular to each other; and the first major axis and the second major axis are parallel to each other, and the first minor axis and the second minor axis are parallel to each other; and in the first direction, an area of the projection of the first reflection area is greater than or equal to an area of the projection of the incident area.

13. The near-eye display device according to claim 12, wherein the substrate has a central optical axis, and a Cartesian coordinate system is constructed with the central optical axis as an origin;

in the Cartesian coordinate system, the shape of the projection of the first reflection area satisfies an equation:

$$\frac{y^2}{a_1^2} + \frac{x^2}{b_1^2} = 1,$$

and $\alpha_1 > b_1 > 0$;

the shape of the projection of the incident area satisfies an equation:

$$\frac{y^2}{a_2^2} + \frac{x^2}{b_2^2} = 1,$$

and $\alpha_2 > b_2 > 0$;

a length of each of the first major axis and the second major axis is 3 mm±0.5 mm, and a length of each of the first minor axis and the second minor axis is 2 mm±0.4 mm; and an eccentricity of the first ellipse is equal to that of the second ellipse.

14. The near-eye display device according to claim 11, wherein in a plane perpendicular to the central optical axis, the central optical axis appears as a point; and each of the incident area, the first reflection area, the second reflection area, and the exit area is point-symmetric with respect to the point; and the first reflection area is axially symmetric with respect to the first major axis and the first minor axis, and the incident area is axially symmetric with respect to the second major axis and the second minor axis.

15. The near-eye display device according to claim 13, wherein a shape of a projection of the exit area in the first direction is a first closed shape, and the first closed shape is formed by surrounding though using two opposite straight edges and two opposite curved edges;

a shape of a projection of the second reflection area in the first direction is a second closed shape, and the second closed shape is formed by surrounding though using two opposite straight edges and two opposite curved edges;

a first distance from a boundary of the incident area to a boundary of the second reflection area along an X-axis of the Cartesian coordinate system is less than a second distance from a boundary of the incident area to a boundary of the second reflection area along a Y-axis of the Cartesian coordinate system;

a third distance from a boundary of the first reflection area to a boundary of the exit area along the X-axis of the Cartesian coordinate system is less than a fourth distance from a boundary of the first reflection area to a boundary of the exit area along the Y-axis of the Cartesian coordinate system;

each of the first distance and the third distance is 2 mm±0.5 mm; and each of the second distance and the fourth distance is 1 mm±0.4 mm.

16. The near-eye display device according to claim 11, wherein the first curved surface and the second curved surface are continuous curved surfaces, each of the first reflection area and the exit area comprises a continuous curved surface, and/or each of the incident area and the second reflection area comprises the continuous curved surface, and the continuous curved surface comprises a single function curved surface; and/or, a solid transmission medium is disposed between the first curved surface and the second curved surface.

17. The near-eye display device according to claim 11, wherein orientation of the first curved surface and orientation of the second curved surface are the same, and the first curved surface and the second curved surface are coaxial with respect to a central optical axis of the display module; the first curved surface and the second curved surface comprises one or a combination of a spherical surface or a free form surface; and in a direction of the central optical axis, the first reflection area and the second reflection area at least partially overlap.

18. The near-eye display device according to claim 17, wherein the first curved surface and the second curved surface are calculated using a Zernike polynomials function, a maximum distance between the exit area and the central optical axis is defined as T3, a maximum distance between the first reflection area and the central optical axis is defined as T2, a maximum distance between the second reflection area and the central optical axis is defined as T5, a maximum distance between the incident area and the central optical axis is defined as T4, and T5>T3>T2>T4.

19. The near-eye display device according to claim 17, wherein a convex surface of the incident area faces the display module, a concave surface of the exit area faces the human eye, a maximum dimension of the first curved surface in a transverse direction is greater than a maximum dimension of the first curved surface in a longitudinal direction, and a maximum dimension of the second curved surface in a transverse direction is greater than a maximum dimension of the second curved surface in a longitudinal direction.

20. The near-eye display device according to claim 11, wherein the substrate is provided with a first reflective layer and a second reflective layer, the first reflective layer is disposed on the first curved surface to form the first reflection area, and the second reflective layer is disposed on the second curved surface to form the second reflection area; and the first reflective layer is located on a side of the substrate facing the human eye, and the second reflective layer is located on a side of the substrate facing the display module.

* * * * *